United States Patent
Goswami et al.

(10) Patent No.: US 11,503,011 B2
(45) Date of Patent: Nov. 15, 2022

(54) MAKING LOCAL DATA AVAILABLE IN A CLOUD COMPUTING ENVIRONMENT

(71) Applicant: INTUIT INC., Mountain View, CA (US)

(72) Inventors: Punam Goswami, Bangalore (IN); Reetesh Agrawal, Bangalore (IN); Bharath Raj Holenarasipura Rajanna, Bangalore (IN); Deep George Zachariah, Bangalore (IN); Hitesh Gaba, Bangalore (IN); Amrut Anegundi, Bangalore (IN); Amudhavani Haridoss, Bangalore (IN); Balaji Krishnamurthy, Bangalore (IN)

(73) Assignee: INTUIT INC., Mountain View, CA (US)

( * ) Notice: Subject to any disclaimer, the term of this patent is extended or adjusted under 35 U.S.C. 154(b) by 154 days.

(21) Appl. No.: 17/145,262

(22) Filed: Jan. 8, 2021

(65) Prior Publication Data

US 2022/0224680 A1 Jul. 14, 2022

(51) Int. Cl.
*H04L 9/40* (2022.01)
*H04L 67/01* (2022.01)

(52) U.S. Cl.
CPC .......... *H04L 63/0807* (2013.01); *H04L 67/01* (2022.05)

(58) Field of Classification Search
CPC ...... H04L 63/00–63/0807; H04L 67/00–67/06
See application file for complete search history.

(56) References Cited

U.S. PATENT DOCUMENTS

| 9,400,801 B1* | 7/2016 | Aplemakh | G06F 16/183 |
| 2007/0171274 A1* | 7/2007 | Yim | H04L 12/1813 348/E7.083 |
| 2013/0097228 A1* | 4/2013 | Ejiri | H04L 61/2589 709/203 |
| 2013/0144921 A1* | 6/2013 | Nakamura | G06F 16/188 707/827 |

(Continued)

OTHER PUBLICATIONS

Why does Facebook use long-polling instead of WebSocket in order to instant chat?—Quora, https://www.quora.com/Why-does-Facebook-use-long-polling-instead-of-WebSocket-in-order-to-instant-chat, 2 pages, retrieved on Oct. 27, 2020.

(Continued)

*Primary Examiner* — Clayton R Williams
(74) *Attorney, Agent, or Firm* — Dla Piper LLP (US)

(57) ABSTRACT

Local data can be made available in a cloud computing environment. A persistent remote connection may be established between a processor and a server. The server may receive a request for data from an external device through a network. The request for data may be sent through the persistent remote connection from the server to a first executable process of the processor. The processor may obtain the data from an application being executed by the processor separately from the first executable process. The data may be sent through the persistent remote connection from the processor to the server. The server may send the data to the external device through the network in response to the request. The persistent remote connection may be maintained in an open state regardless of a status of the request for data.

20 Claims, 13 Drawing Sheets

(56) References Cited

U.S. PATENT DOCUMENTS

2021/0400317 A1* 12/2021 Luo .................. H04N 21/23106

OTHER PUBLICATIONS

Ben Hamilton—Quora, https://www.quora.com/profile/Ben-Hamilton-15, 3 pages, retrieved on Oct. 27, 2020.
Building Facebook Messenger, Facebook Engineering, Aug. 12, 2011, https://www.facebook.com/notes/facebook-engineering/building-facebook-messenger/10150259350998920, 2 pages, retrieved on Oct. 27, 2020.
Facebook for Developers, https://developers.facebook.com/blog/post/610/?locale=zh_hk, 15 pages, retrieved on Oct. 27, 2020.

\* cited by examiner

MAKING LOCAL DATA AVAILABLE IN A CLOUD COMPUTING ENVIRONMENT

BACKGROUND

Cloud computing, providing on-demand availability of computer system resources over the Internet or other networks, is increasingly common. Cloud computing involves hosting data and other computing resources on network-accessible servers so that they can be consumed on demand by external devices that have network communication capabilities. However, a great deal of data is not available on the cloud. This data is local data available at a particular computing device or other non-remotely accessible computing environment. In many cases, a data holder makes a deliberate choice to keep the local data on a local machine for security and/or privacy reasons. In other cases, the local data is generated and/or controlled by software that is configured to be executed locally and not hosted in the cloud. Whether for these reasons or others, there is a great deal of local data that is not, and is unlikely ever to be, hosted in the cloud.

At the same time, due to the increasing prevalence of cloud computing generally, there is a large and growing collection of computer systems and processes that could make use of such local data if only it were available on the cloud. Accounting software (e.g., QuickBooks™) provides an example. There are cloud-based and local versions of accounting software that are both concurrently offered and supported (e.g., QuickBooks™ Online and QuickBooks™ Desktop, respectively). Third parties offer apps that leverage accounting software data to augment the accounting software and/or provide various other services. These apps can access data from the cloud-based accounting software, but generally they cannot get data from the local accounting software in a secure, stable, resource efficient, on-demand, and real-time manner. For example, apps attempting to get local data experience poor stability and performance relative to cloud-based data sourcing, encounter integration issues (e.g., requiring separate code components for cloud and local data gathering), and/or require cumbersome and ad-hoc client connection methods such as long polling (e.g., such as used in Autofy and MQ Telemetry Transport), or maintaining parallel data sets and periodically synchronizing, to communicate with clients hosting the local data.

BRIEF DESCRIPTIONS OF THE DRAWINGS

DETAILED DESCRIPTION OF SEVERAL EMBODIMENTS

Embodiments described herein make local data stored by a client device available in a cloud computing environment in real time, as though the local data were hosted in the cloud. To accomplish this task, the client device and a server establish a persistent remote connection, such as a WebSocket, with one another. The server is network accessible (e.g., via the Internet) and receives requests for local data from external devices through the network. The server sends these requests to the client through the persistent remote connection, allowing the client to authenticate the requester and, if authenticated, send the data to the server through persistent remote connection. The server can then send the data to the requesting external device as though it came directly from the server itself or elsewhere in the cloud. This functionality can be useful in a variety of contexts, such as providing external app integration of network-based apps with software executed locally by the client device, keeping sensitive data local rather than cloud-based while still allowing cloud-based processing of the sensitive data as appropriate, and others.

Figure 1:
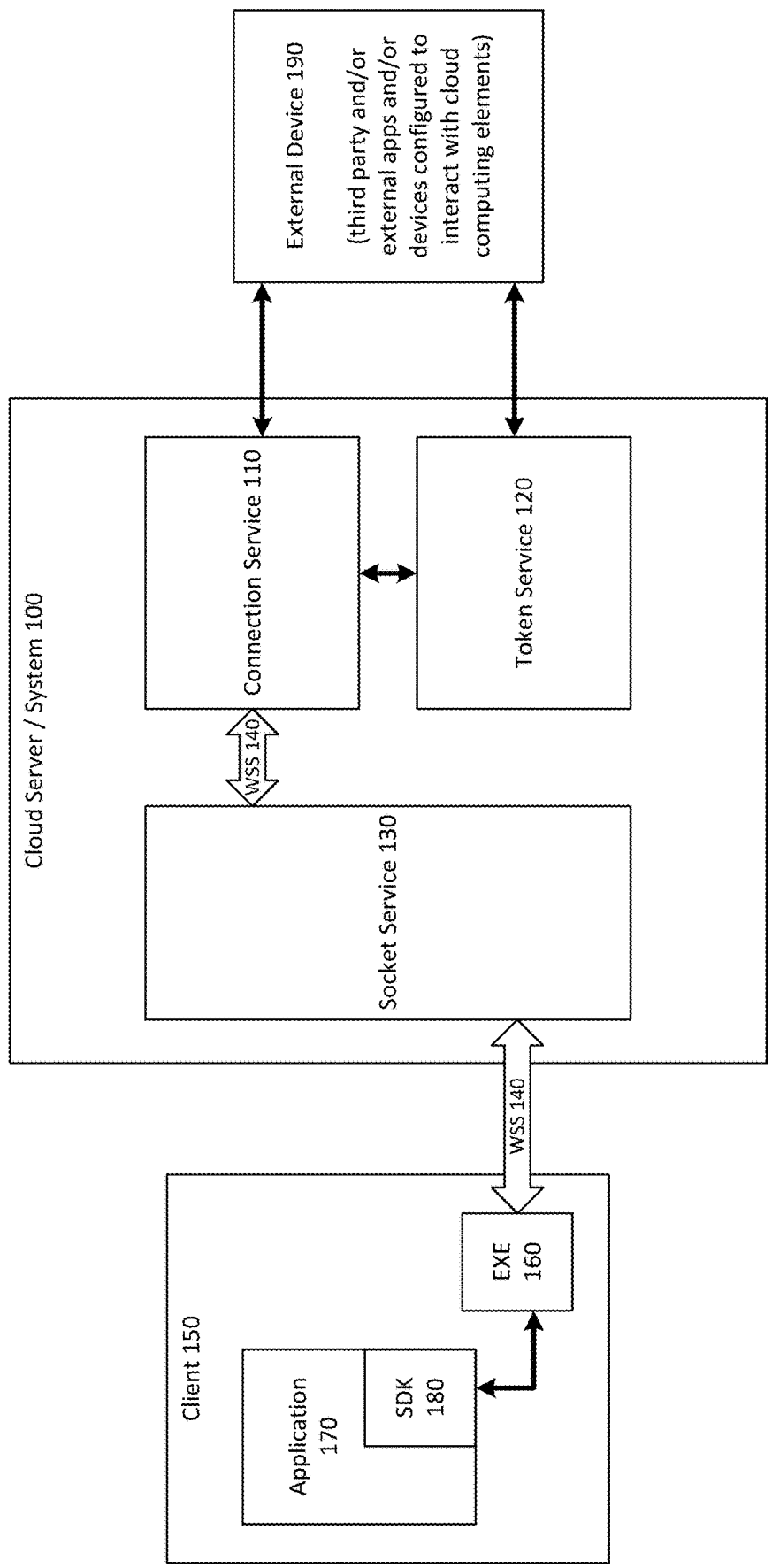
FIG. 1 shows a cloud and local computing environment according to some embodiments of the disclosure.

FIG. 1 shows a cloud and local computing environment according to some embodiments of the disclosure. The environment may include a variety of computer components that interact with one another through one or more networks. For example, the components of FIG. 1 include at least one server 100, at least one client 150, and at least one external device 190. The client 150 executes software that generates and/or processes data locally. Server 100 is a computer or combination of computers and/or other elements that is configured to make the data on client 150 available on the cloud or otherwise readily available to external device 190. As described in detail below, for example, data obtained from client 150 may appear to be hosted in the cloud (e.g., by server 100) from the perspective of external device 190, and may be accessible to external device 190 in like fashion to data that is truly hosted in the cloud.

Server 100 includes connection service 110, token service 120, and/or socket service 130. The functions of these services are described in detail below, but may be summarized as follows. Connection service 110 receives requests for local data from external device 190 through a network such as the Internet. The local data is stored off the cloud by client 150. Connection service 110 may respond to such requests by sending the local data to external device 190 (e.g., assuming it is available and/or the external device 190 has been verified). The responses may, from the perspective of external device 190, appear substantially the same as if they included cloud-hosted data. Token service 120 supplies credentials to external device 190 that may be included in the requests for local data and verified (e.g., by client 150) to enhance security of data exchanges. Socket service 130, together with client 150, establishes a persistent remote connection (e.g., WebSocket connection) 140 between client 150 and server 100, allowing connection service 110 to communicate with client 150 through persistent remote connection 140.

External device 190 can request data from server 100. For example, external device 190 may be a server operating one or more cloud-based apps. These apps may use the requested data to provide functionality beyond that provided by client 150. For example, external device 190 can execute an app that provides enhancements to accounting software (e.g., application 170) executed by client 150. In any case, external device 190 interacts with connection service 110 as though connection service 110 were part of a cloud-based data source. For example, connection service 110 may expose an application programming interface (API) through the network, which external device 190 can use to submit the request. Thereafter, connection service 110 receives the request for data through the API. In some cases, token service 120 may also communicate with external device 190, for example by sending a token to external device 190. Thereafter, external device 190 will be able to insert the token in its requests to connection service 110 to allow for secure authentication.

Client 150 is configured to execute one or more applications 170 that generate and/or process local data. Client 150 is also configured to execute a first executable process ("EXE") 160 that communicates with server 100 and that may be a separate process from application 170. EXE 160 can be an executable (.exe) file in some embodiments, but may include different software, hardware, and/or firmware elements in other embodiments. EXE 160 establishes the persistent remote connection 140 with socket service 130 and, thereby, with connection service 110. Accordingly, client 150 can receive requests for data from server 100. EXE 160 receives these requests and obtains local data from application 170, for example using a software development kit (SDK) 180 of application 170 that provides access to the local data being generated and/or processed by application 170. EXE 160 sends local data to server 100 through the persistent remote connection 140, and server 100 can then send the local data to external device 190. In some embodiments, EXE 160 may authenticate a request for data received from server 100, for example by processing comprising validating a token (e.g., originating at token service 120) included in the request for data as received by server 100.

Elements of server 100, client 150, and external device 190 are each depicted as single blocks for ease of illustration, but those of ordinary skill in the art will appreciate that these may be embodied in different forms for different implementations. For example, connection service 110, token service 120, and socket service 130 may be provided by a single device or respective separate devices, and/or any or all of these services may be distributed across multiple devices. For example, server 100 may include a plurality of servers that may be respectively dedicated to connection service 110, token service 120, and socket service 130 or that may be flexible enough to individually handle processing related to each of these services or subsets thereof. Moreover, while one server 100, client 150, EXE 160, application 170/SDK 180, and external device 190 are shown for ease of illustration, various embodiments may include a plurality of any or all of the above elements. For example, multiple external devices 190 may access local data, and/or there may be multiple clients 150 and/or applications 170 that store and process local data. In the latter case, each client 150 will have its own separate secure persistent remote connection 140 with server 100.

Figure 2:
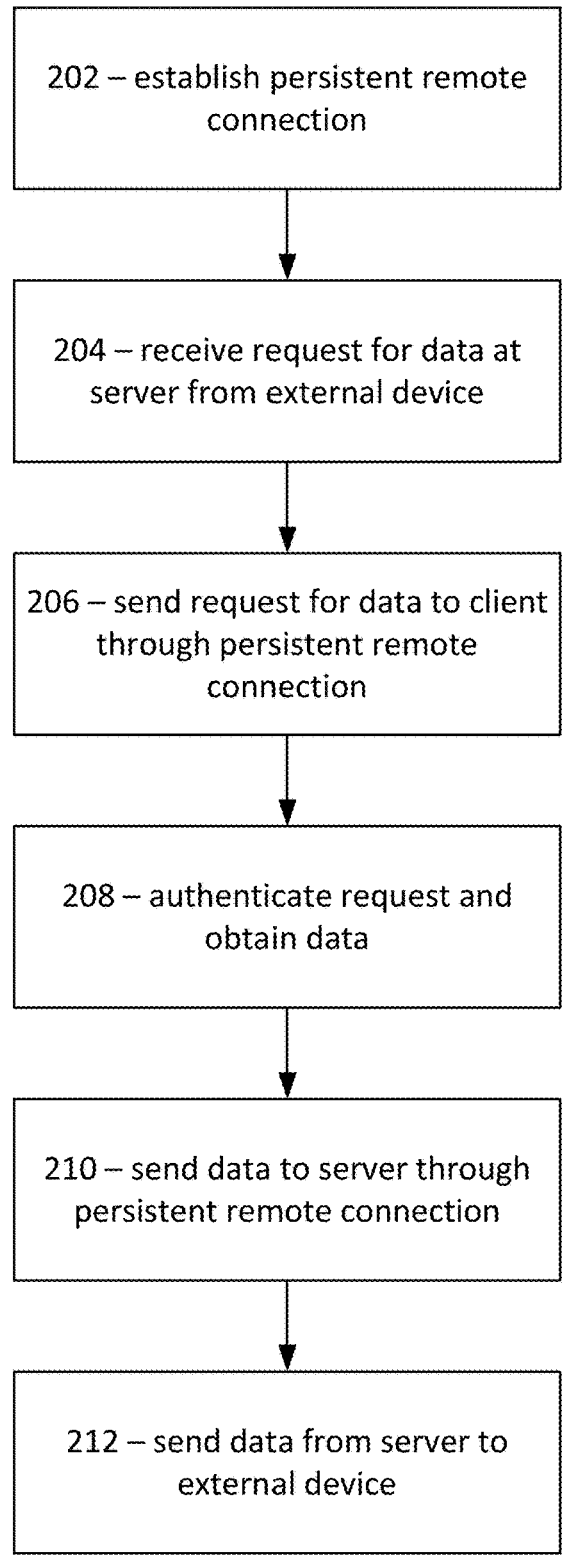
FIG. 2 shows a process for making local data available in a cloud computing environment according to some embodiments of the disclosure.

FIG. 2 shows a process 200 for making local data available in a cloud computing environment according to some embodiments of the disclosure. Server 100 and client 150 can work together to perform process 200 to respond to requests for data from external device 190.

At 202, client 150 and server 100 establish a persistent remote connection 140 with one another. For example, client 150 and server 100 may establish a WebSocket connection with one another using standard WebSocket connection procedures, such as using a WebSocket handshake request from client 150 to server 100 or from server 100 to client 150 and subsequent reply in the opposite direction. This may produce an open WebSocket on client 150, allowing server 100 to send requests to client 150 through the persistent remote connection 140 on demand. Socket service 130 can provision the persistent remote connection 140 to allow data to be sent to and from connection service 110, as connection service 110 may handle data requests and may therefore have the need to request data from client 150 from time to time. The WebSocket protocol enables interaction between EXE 160 and socket service 130/connection service 110 with lower overhead than half-duplex alternatives such as polling, facilitating real-time data transfer. The WebSocket connection allows server 100 to send requests to the client 150 without first forming an ad hoc connection to client 150 through polling and allows messages to be passed back and forth while keeping the persistent remote connection 140 open (i.e., full duplex communication). The persistent remote connection 140 is therefore a connection between client 150 and server 100 that is maintained in an open state regardless of data request status. That is, regardless of whether there is a pending data request, whether a data request has been served already, or whether no data request has yet been exchanged at all, there is an open persistent remote connection 140 between client 150 and server 100. This can be contrasted with an ad hoc connection, such as a polling connection, because the ad hoc connection is opened when data is requested and closed after the data is delivered. This is true even of long polling, where the connection can remain open for a long time (i.e., for as long as it takes data to be delivered). From the perspective of devices external to client 150 and server 100, persistent remote connection 140 is behind an API gateway and is thus shielded from interference such as DDOS attacks, throttling, etc.

In some embodiments, the persistent remote connection 140 may be a secure WebSocket connection (WSS) or other secured persistent remote connection 140. For example, a secured persistent remote connection 140 such as WSS can include security features such as secure sockets layer (SSL) and/or transport layer security (TLS) encryption for communications over persistent remote connection 140. For example, during the handshake and response to establish a WebSocket, an SSL or TLS socket may be requested, and a certificate of the requesting device may be verified by the target device (and, in some cases, a certificate of the target device may be verified by the requesting device), in addition to the standard WebSocket handshake processing. SSL/TLS protocol encrypts Internet traffic of all types, providing secure Internet communication through the use of strong encryption algorithms.

For example, in some embodiments, the WSS connection may require a valid user token to initiate. An example of a token scheme could include the Intuit OAuth2.0 token associated with a One Intuit Identity (OII) account or "UserID" for a user of client 150 and a similar Realm ID ("CompanyID") for external device 190. Each user associated with a client 150 who wishes to use the WSS connection may be required to set up a UserID, and each provider associated with an external device 190 who wishes to use the WSS connection may be required to set up a CompanyID. Those of ordinary skill will appreciate that other login and/or token provisioning systems can also provide UserID and/or CompanyID features or other tokens. Authn/Z may thus be provided via an OAuth2.0 token and Realm Id. To establish the WSS connection, client 150 may first be authenticated by server 100, for example by client 150 sending a UserID/password combination and server 100 validating the combination. Then, server 100 can check UserID and RealmID for authorization for the connection (e.g., where OAuth2 token contains UserID, Realm ID, and an identifier of the service being provided by external device 190 for use with application 170 ("AppID")). The WebSocket provides a long-lived persistent connection to make data transfer of data residing at a client 150 happen in real time, enabling local data to be available anywhere using the secured WebSocket communication over OII AuthnZ.

At 204, server 100 receives a request for data from external device 190. For example, connection service 110 may expose an API through the Internet or another network. External device 190 may use the API to submit the request for data. Specifically, some embodiments may provide a customer facing RESTful API with internet key sharing (IKS) exposed to third-party developers (e.g., via external devices 190). This may have the effect of abstracting asynchronous WebSocket calls behind a RESTful API layer to give a simplified experience to the third party. For example, connection service 110 can expose one or a variety of endpoints through the API layer, such as "register" for registration and "sdkrequest" for a data fetch operation. Other embodiments may use other known or novel communications techniques to facilitate receiving the request by connection service 110. Server 100 can evaluate the request to determine how to obtain the requested data. For example, the request may identify a particular client 150 from which the data is to be obtained. In another example, the request may identify particular data, and server 100 may access a table or other information to look up where the identified particular data can be obtained (e.g., from client 150 or from some other data source). In some embodiments, the request may include a token of external device 190.

The following is an example of a request and response through the API for an "sdkrequest" wherein a customer (e.g., external device 190) requests a data fetch through the API which causes server 100 to respond. Specifically, this example shows a customer query for a list of customers associated with a company and a response delivering the requested list.

```
Request format:
POST /v1/qbdt/sdkrequest HTTP/1.1
Host: public.api.intuit.com
Authorization:Bearer xxxxx
Content-Type:application/xml
<?xml version=\"1.0\" ?>
<?qbxml version=\"4.0\"?>
<QBXML>
   <QBXMLMsgsRq onError=\"stopOnError\">
      <CustomerQueryRq requestID=\"2\">
      </CustomerQueryRq>
   </QBXMLMsgsRq>
</QBXML>
   Response format:
<?xml version= \"1.0\" ?>
<QBXML>
   <QBXMLMsgsRs>
      <CustomerQueryRs requestID=\"2\" statusCode=\"0\"
   statusSeverity=\"Info\" statusMessage= \"Status OK\">
         <CustomerRet>
            <ListID>80000003-1569294529</ListID>
            <TimeCreated>2019-09-24T08:38:49+3005:30</TimeCreated>
            <TimeModified>2019-09-
         24T08:38:49+05:30</TimeModified>
            <EditSequence>1569294529</EditSequence>
            <Name>cris</Name>
            <FullName>cris</FullName>
            <IsActive>true</IsActive>
            <Sublevel>0</Sublevel>
            <Balance>0.00</Balance>
            <TotalBalance>0.00</TotalBalance>
            <JobStatus>None</JobStatus>
```

-continued

```
         </CustomerRet>
         <CustomerRet>
            <ListID>80000004-1582083337</ListID>
            <TimeCreated>2020-02-19T09:05:37+05:30</TimeCreated>
            <TimeModified>2020-02-
         19T09:05:37+3005:30</TimeModified>
            <EditSequence>1582083337</EditSequence>
            <Name>Tom</Name>
            <FullName>Tom</FullName>
            <IsActive>true</IsActive>
            <Sublevel>0</Sublevel>
            <Balance>0.00</Balance>
            <TotalBalance>0.00</TotalBalance>
            <JobStatus>None</JobStatus>
         </CustomerRet>
      </CustomerQueryRs>
   </QBXMLMsgsRs>
</QBXML>
```

At 206, server 100 sends the request for data from connection service 110 to EXE 160 through the persistent remote connection 140. For example, after determining which client 150 has the requested data (if applicable), connection service 110 uses persistent remote connection 140 to send the request to EXE 160. If the request from external device 190 included a token, connection service 110 can also send the token through persistent remote connection 140 to EXE 160.

At 208, EXE 160 can obtain the data from application 170. In some embodiments, application 170 exposes an SDK 180, and EXE 160 can direct application 170 to supply the requested data through SDK 180. Other embodiments may use other interaction techniques (e.g., application 170 may expose an API that EXE 160 can use, or EXE 160 may be embedded in application 170).

For example, an interaction between EXE 160 and application 170 can take place via SDK 180 as follows. For each request, EXE 160 makes local API calls to SDK 180 library to connect with application 170 on behalf of external device 190. The input request can be in XML format, and the corresponding response generated by application 170 can also be in XML format. EXE 160 can end the session with SDK 180 and close the SDK connection once the response is transferred. EXE 160 sends the response to server 100 through the persistent remote connection 140.

In embodiments where the request from external device 190 included a token, EXE 160 can authenticate the request for data before obtaining the data from application 170. For example, EXE 160 may attempt to validate the token. If the token is valid, processing may continue (e.g., including obtaining the data from application 170 and continuing process 200). If not, EXE 160 can return an error message or otherwise refuse to service the request and, in some embodiments, may notify server 100 through persistent remote connection 140 that the request cannot be fulfilled.

At 210, EXE 160 sends the request for data from to connection service 110 of server 100 through the persistent remote connection 140.

At 212, connection service 110 of server 100 responds to the request for data from external device 190. The response can include the requested data obtained from client 150 as described above or, in the case where the request was not authenticated, a response indicating an error or otherwise indicating that the request will not be served. As the persistent remote connection 140 allows for on demand, bilateral communication between server 100 and client 150, it will appear to external device 190 as though the server 100 was able to serve the request and supply the data directly. That is, from the point of view of external device 190, the server 100 appears to be delivering cloud-based data in response to the request. The data is delivered on external device 190 demand via a network like ordinary cloud data.

Figure 3:
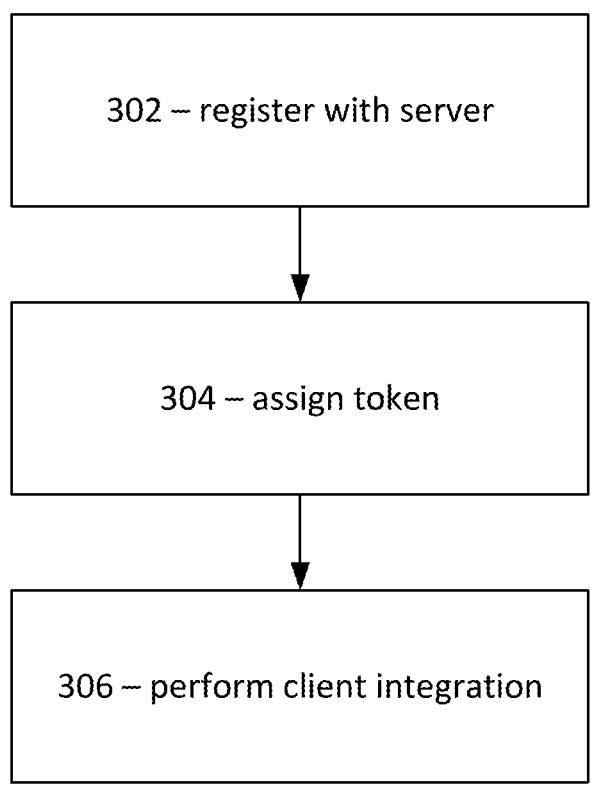
FIG. 3 shows an onboarding process associated with making local data available in a cloud computing environment according to some embodiments of the disclosure.

FIG. 3 shows an onboarding process 300 associated with making local data available in a cloud computing environment according to some embodiments of the disclosure. External device 190 can request data from server 100. In some embodiments, onboarding process 300 may be performed to prepare external device 190 to make such requests and receive the requested data.

At 302, external device 190, or a component thereof, registers with server 100. For example, external device 190 may be a server operating one or more cloud-based apps. These apps may use the requested data to provide functionality beyond that provided by client 150. App developers can use external device 190 to access a developer portal hosted by server 100. The developer portal can include a user interface (UI) providing one or more options for registering an application, and the developer may use the UI to initiate the registration. External device 190 can send data identifying the app to server 100 to trigger subsequent portions of process 300.

At 304, server 100 assigns a token to external device 190 or a component thereof (e.g., an app being registered). For example, the token may be an OAuth2 token or other token that provides secure access to APIs for a uniquely identifiable entity. Server 100 sends the token to external device 190 through a network or by some other transmission mechanism. When external device 190 receives the token, external device 190 and/or its app can be authenticated in connection with subsequent requests for data as described herein. For example, external device 190 can include the token in its requests for local data, and client 150 can authenticate external device 190 by authenticating the token. Specifically, in some embodiments, for each restful API request, external device 190 passes OAuth2.0 token to server 100. OAuth2.0 contains header information such as access token, UserID, CompanyID (RealmID), appID (external device 190). This header information is used for validation of authentication (access token) and authorization (CompanyID and UserID association). A sample authorization header containing tokens may be as follows:

```
app_name: Rabbit Inventory
assetalias: external.idg.fa687fc6-a8e4-4390-9413-14e60b0ba41d
authorization: IAM_Authentication token_type="IAM-Ticket",
resourceownerid="9130353160405836", token=
"V1-42-X38cpi9k32zn4v316dyb4m",
userid="123146453052224", realm id="9130353160405836"
```

At 306, client 150 and server 100 may perform an integration process related to the app of external device 190. As described in further detail below with respect to FIG. 4, a client dashboard UI may be available locally at client 150 and/or at client 150 from server 100 via a network (e.g., through a browser or other app of client 150). Using the UI, a user of client 150 can select apps or particular external devices 190 which should be allowed to access local data of client 150. For example, the user may wish to integrate app functionality hosted by external device 190 with locally-executed application 170. Once the user has selected an app and/or external device 190 that has been registered and tokenized as described above, the app and/or external device 190 can request and receive data in the manner described above with respect to FIG. 2, for example.

Figure 4:
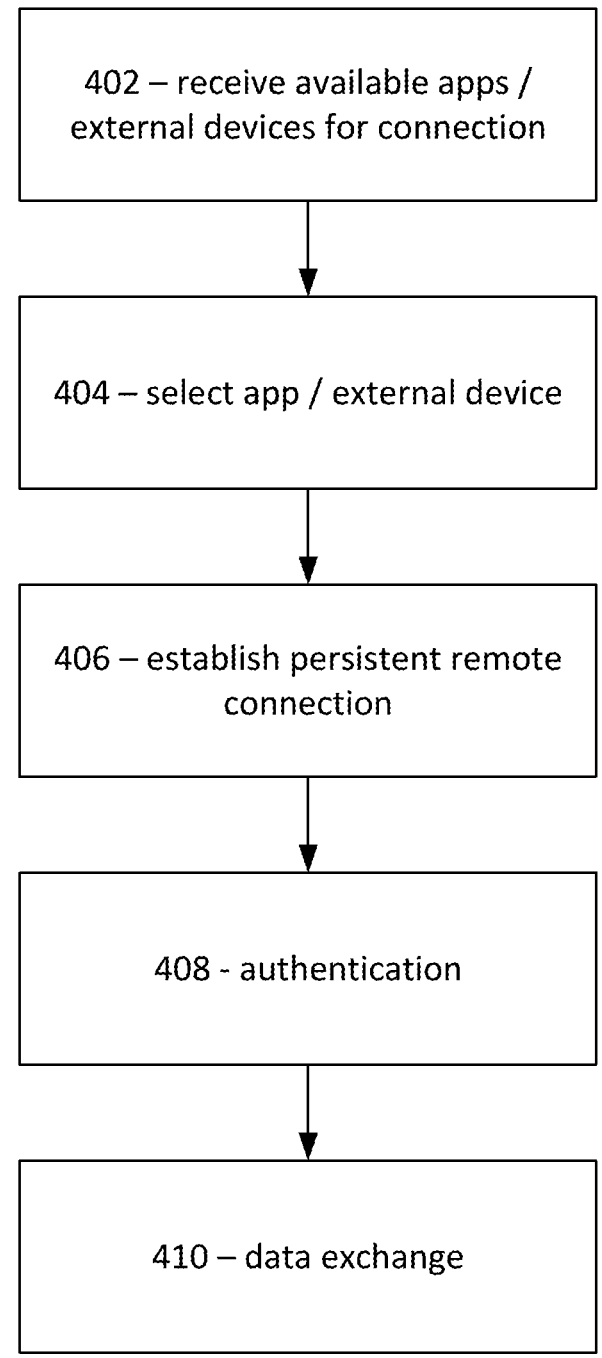
FIG. 4 shows a client configuration and connection process associated with making local data available in a cloud computing environment according to some embodiments of the disclosure.

FIG. 4 shows a client configuration and connection process 400 associated with making local data available in a cloud computing environment according to some embodiments of the disclosure. By performing process 400, client 150 can be configured for connection with server 100 and distribution of local data through server 100 to external device 190. In some embodiments, client 150 may further be able to authenticate a request from external device 190 that has been onboarded according to process 300 or otherwise provisioned with a token or other security data. As some components of process 400 can involve a client 150 side UI in at least some embodiments, sample screenshots of UI elements 500-570 of FIGS. 5A-5H are presented and explained where appropriate.

Figure 5A:
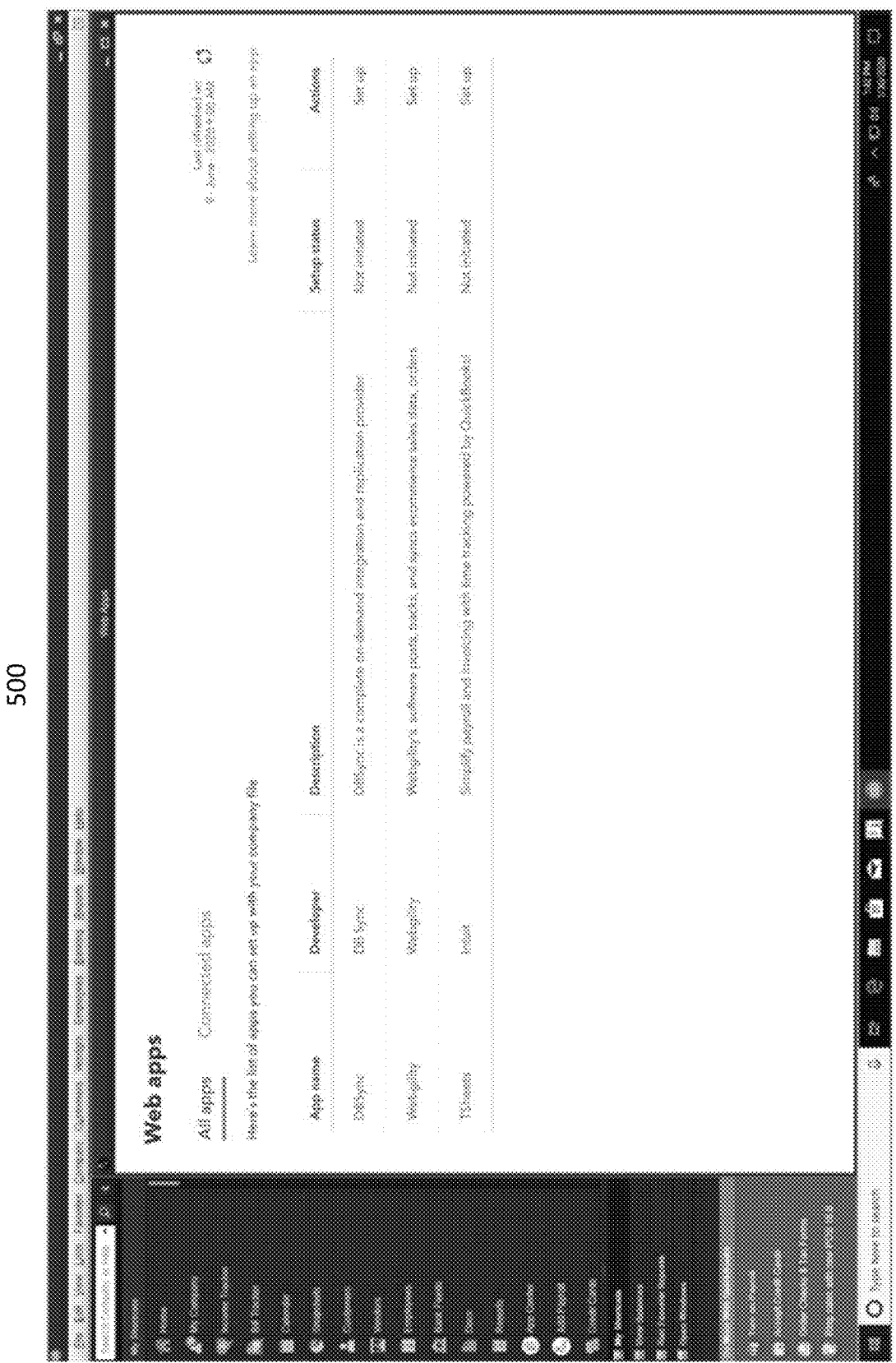
FIGS. 5A-5H show client screenshots associated with accessing local data available in a cloud computing environment according to some embodiments of the disclosure.

At 402, client 150 receives data related to available apps and/or external devices 190 that are available to utilize local data of client 150. For example, as described above with respect to FIG. 3, external devices 190 and/or apps hosted by external devices 190 may have been onboarded with server 100. Server 100 can provide data describing the onboarded apps and/or external devices 190, such as data indicating names, functionalities, local data that will be used if connected, etc. In some embodiments, server 100 can provide this data in response to a request from client 150 made over a persistent remote connection 140 or over a network such as the Internet using any known or proprietary network communication techniques. In some embodiments, client 150 may display this data in a UI, allowing a user to view information about apps and/or external devices 190 and make selections of apps and/or external devices 190 to which she wishes to connect. FIG. 5A shows an example screenshot of such a UI, wherein a list 500 of available apps is presented to a user.

Figure 5B:
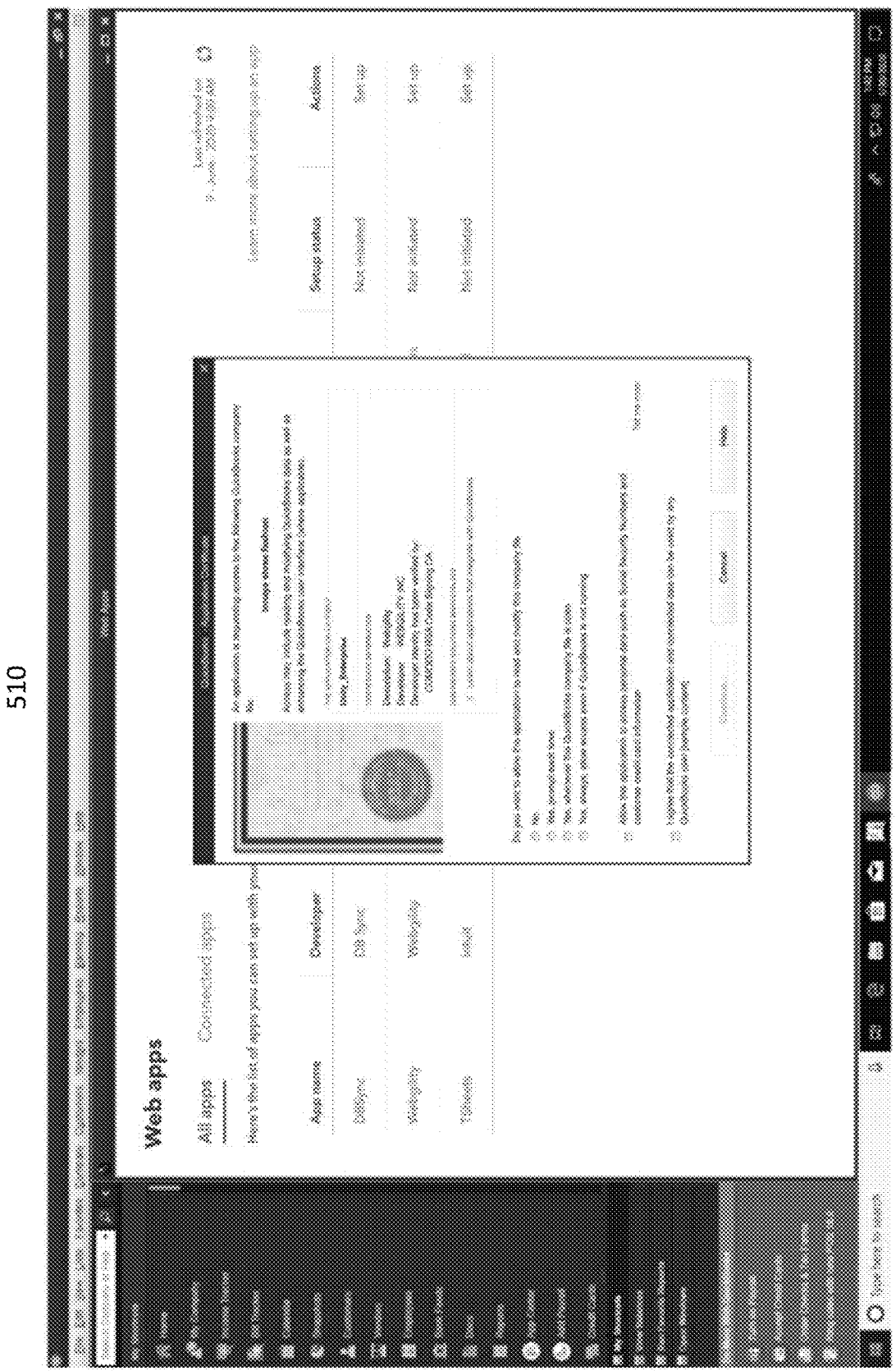
Figure 5C:
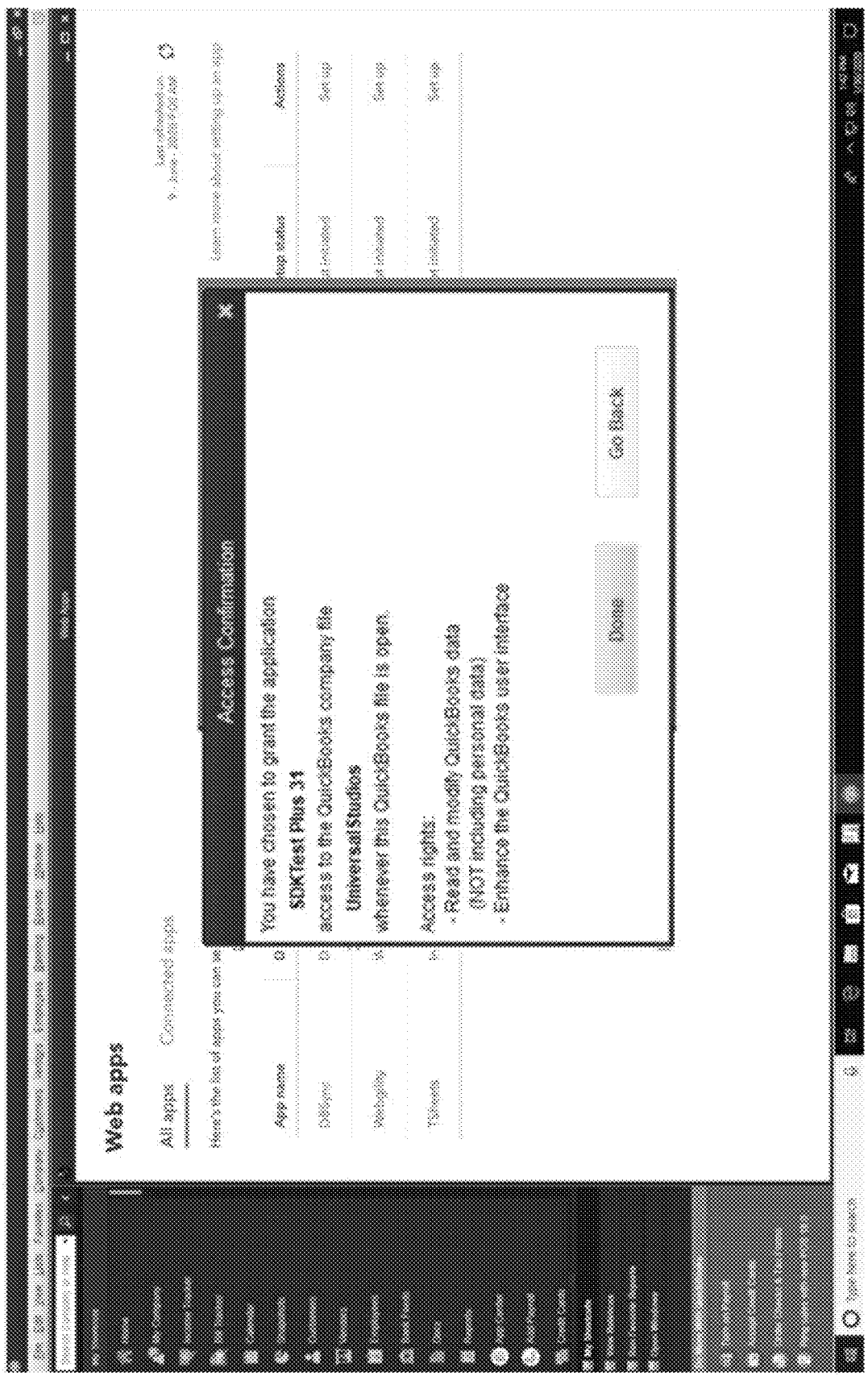

At 404, client 150 selects one of the available apps and/or external devices 190 as a registered data user. For example, a user may make a selection using the UI. Client 150 can then send the selection to server 100. FIGS. 5B and 5C provide an example. In FIG. 5B, a user has selected one of the apps in the list 500, and details 510 about the app (e.g., as received from server 100 at 402) are displayed. The details 510 may include not only details about the app, but also options to select the app for connection and/or certain parameters under which the app will be allowed to access local data. For example, options may include limits on what local data can be accessed, when it can be accessed (e.g., certain times, only when open locally, only after a prompt and acceptance, etc.). As shown in FIG. 5C, after a user has selected an app as in FIG. 5B, the UI may provide an access confirmation 520, whereby the user can confirm that they wish to allow the app to access local data. Once the user confirms, client 150 can send the selection to server 100.

At 406, client 150 and server 100 establish persistent remote connection 140. If client 150 and server 100 have not yet established persistent remote connection 140 (e.g., in connection with providing access to a different app and/or external device 190 than the one currently being connected), client 150 and server 100 will establish persistent remote connection 140 at this point. For example, persistent remote connection 140 may be established as described above.

At 408, client 150 authenticates the selected app and/or external device 190. As described above with respect to FIG. 3, external device 190 and/or app will have had a token assigned thereto by server 100 during the onboarding process 300. Server 100 can also provide the token to client 150. Then, as described above, external device 190 may send a request to server 100 that includes the token. In this example, the request can be a request to register with client 150 rather than a request for data as described above. In any case, the request (whether a request to register or a request for data) will include the token. Server 100 will pass the request to client 150 using persistent remote connection 140. Client 150 will validate the token in the request against the token previously provided by server 100. For example, EXE 160 can receive external device 190 user identity information (e.g., CompanyID, UserID, AppID, etc.) via persistent remote connection 140. The identity information can then be authenticated and authorized by EXE 160. Once authentication is performed for client 150 by EXE 160, local data can be fetched from application 170 and returned to EXE 160.

At 410, client 150 and the selected app and/or external device 190 can exchange information using persistent remote connection 140. For example, as seen in FIGS. 5D and 5E, data from external device 190 may enable client device 150 to show app information in the UI.

Figure 5D:
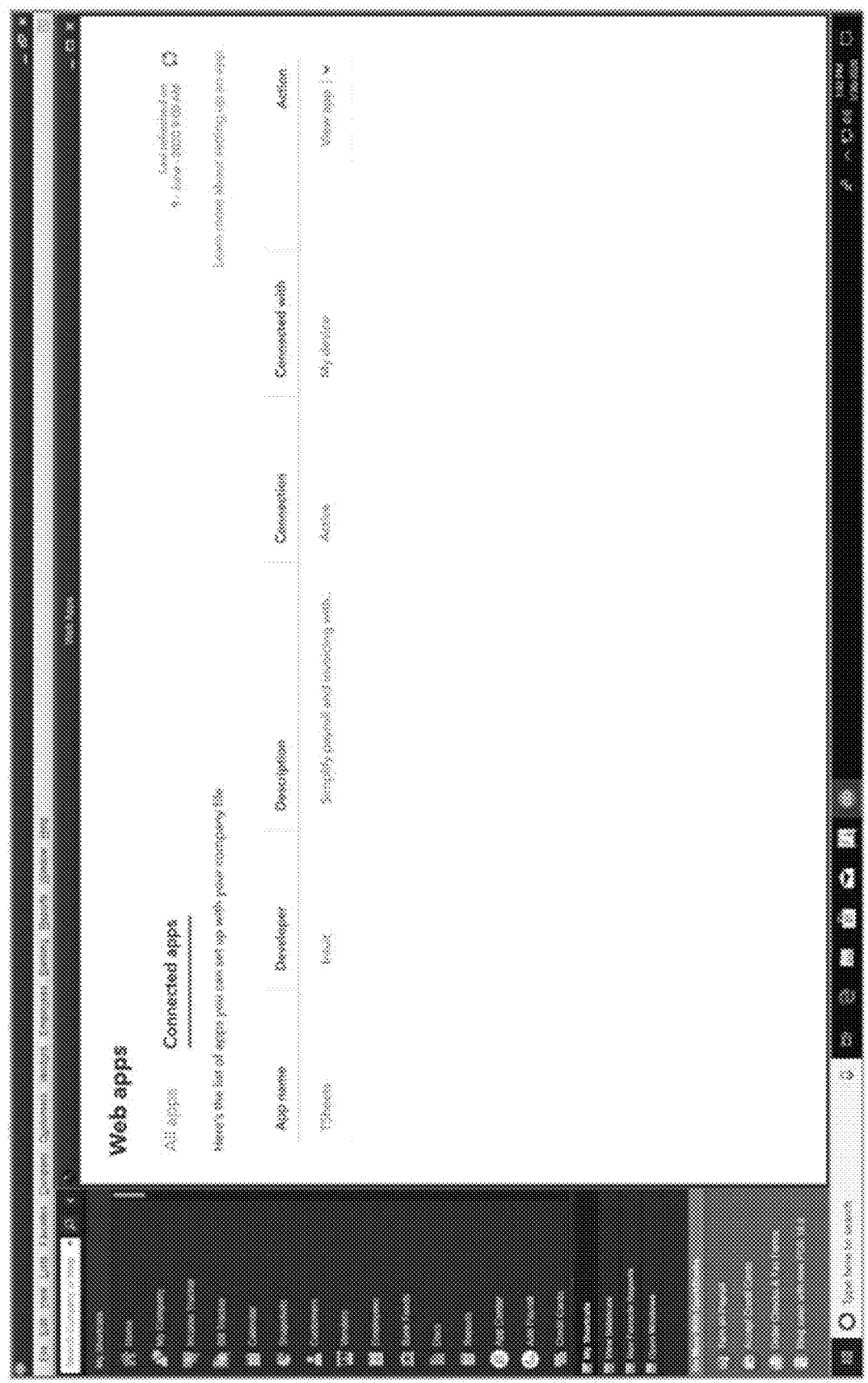

FIG. 5D shows app name, developer name, and description (which may have been previously displayed at 402) in addition to connection status, device status, and available activities in connected app list 530. Specifically, the example of FIG. 5D illustrates the list of connected/authorized external devices 190 which is already connected to application 170 as part of the registration process. In the UI, the connection column shows whether the WSS connection status from EXE 160 to server 100 is active or not. Column 'Connected with' illustrates the WSS connection from client 150. This can be useful in multi-user scenarios to differentiate machines connected to the same local files.

Figure 5E:
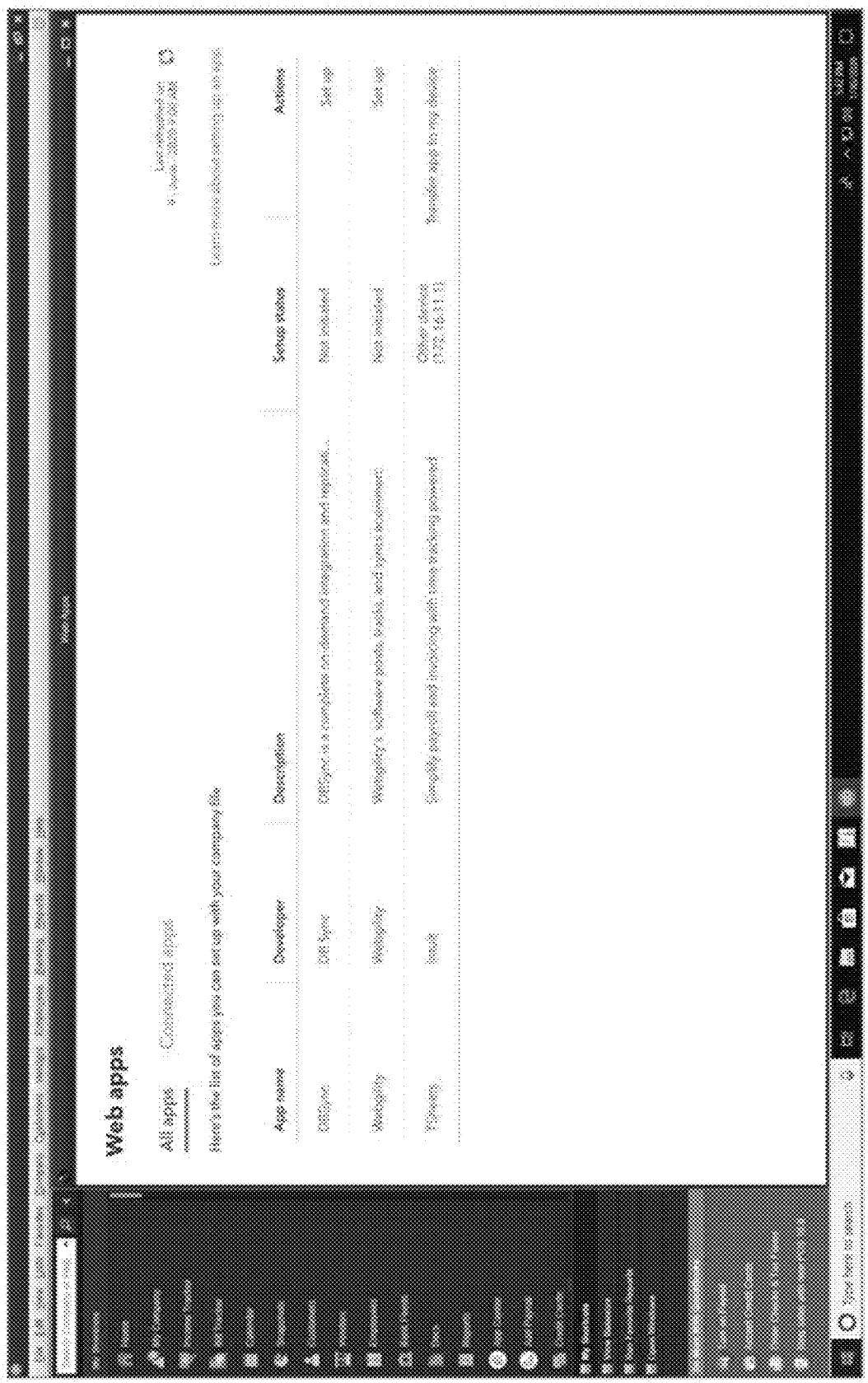

FIG. 5E shows an example of how the same information can be displayed in a list of all apps (including those available but not connected) 540. Specifically, the example of FIG. 5E illustrates the list of all authorized external devices 190 which can connect to application 170. The UI lists the app name, description, and developer name for each of the external devices 190. "Setup status" shows the WSS connection from client 150 to server 100. This can be useful in multi-user scenarios to differentiate machines connected to the same local files. The "Setup" button in the Action column allows external device 190 to register the app provided by external device 190 with application 170.

Moreover, at this point external device 190 can send requests for local data through server 100 to client 150 as described above, and client 150 can send the local data back to external device 190 through server 100 as described above (e.g., see FIG. 2). An example is illustrated by FIGS. 5F-5H.

Figure 5F:
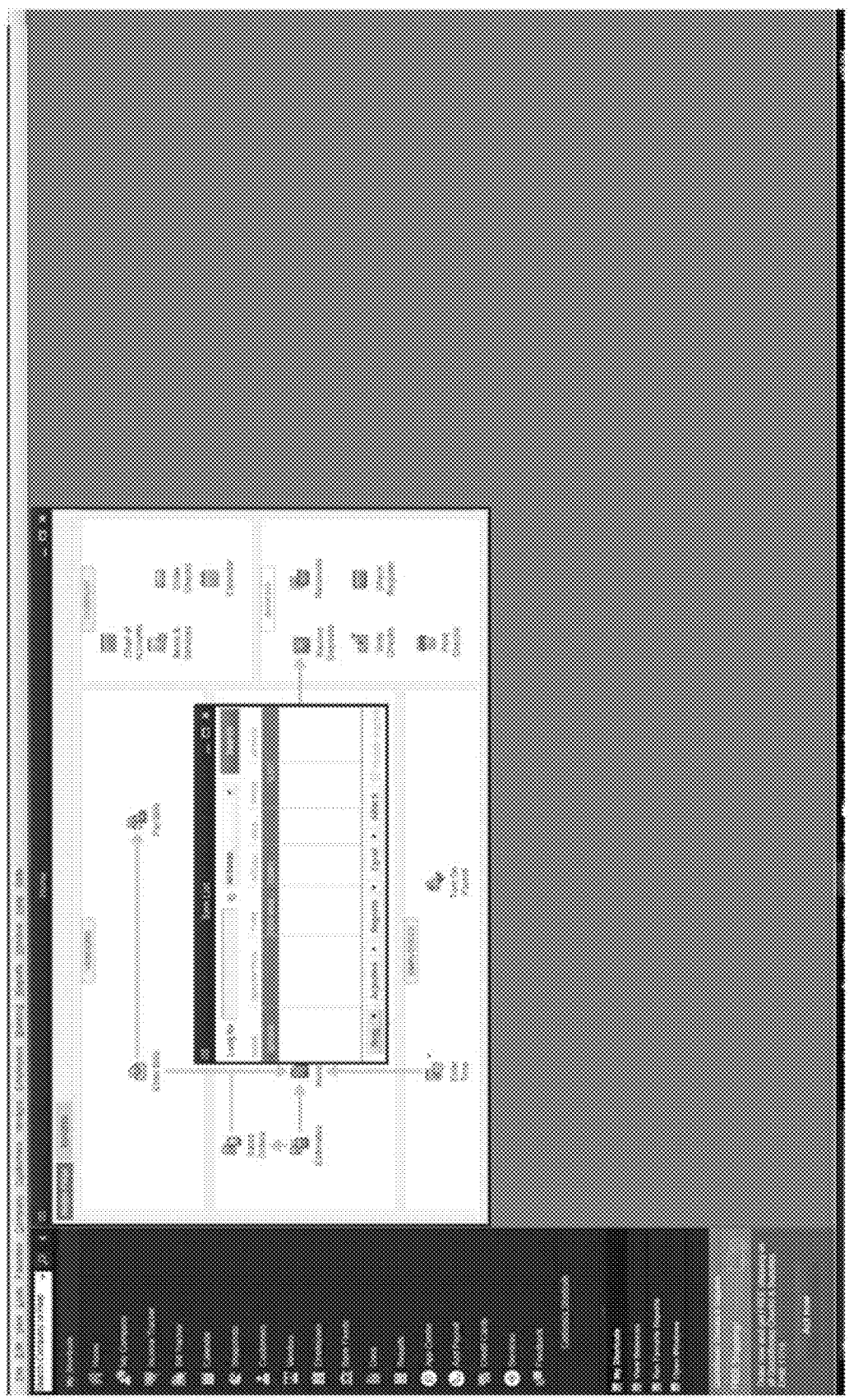
Figure 5G:
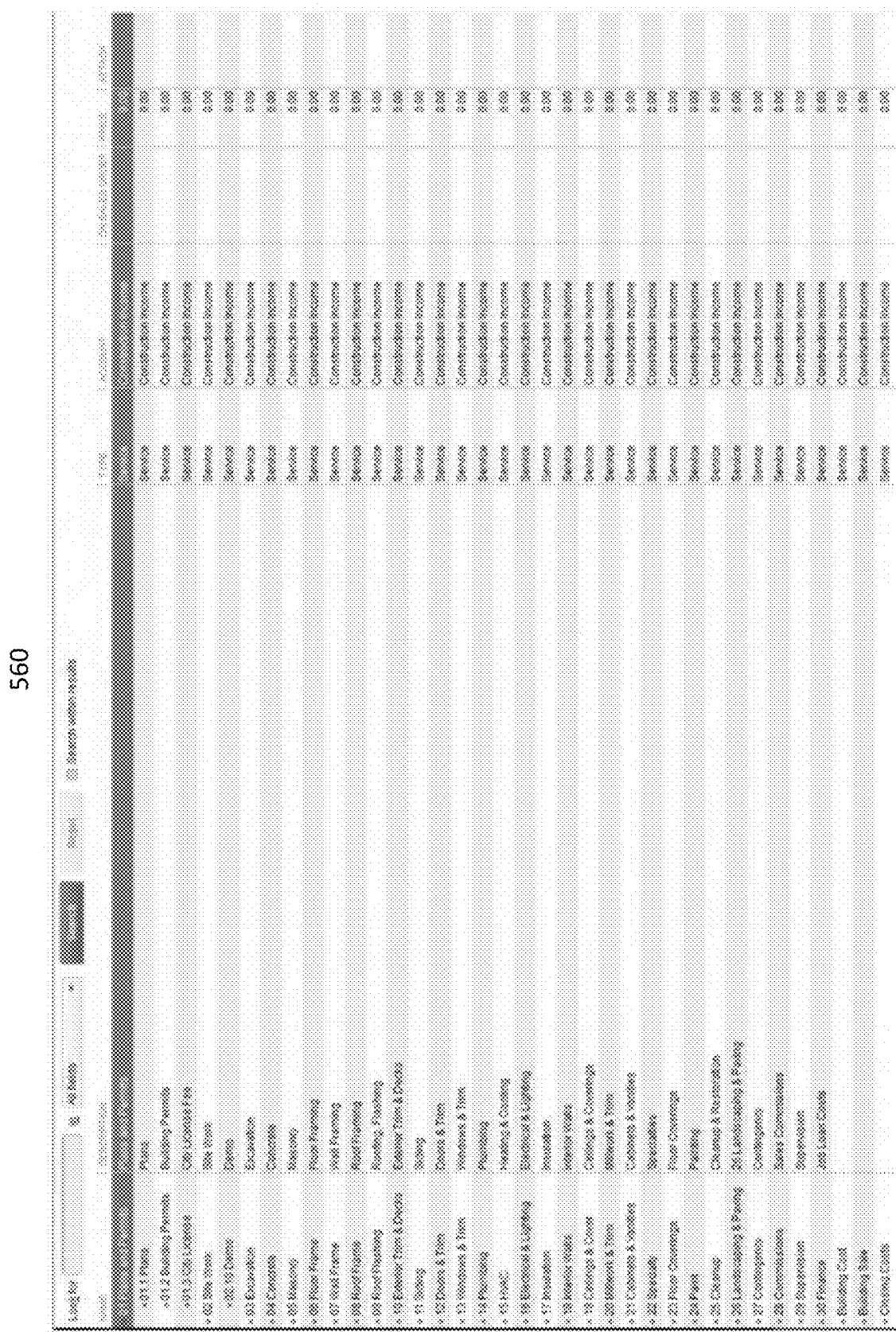

In FIGS. 5F and 5G, application 170 provides UIs 550 and 560, respectively, and the user of client 150 can work with local data though UIs 550 and 560. When the user wishes to use functionality provided by a connected app from external device 190 that has been connected as described above, external device 190 can make an API call to get the local data from client 150, process the data, and send results back to client 150. Specifically, the example of FIGS. 5F and 5G illustrates the "Item list" feature in application 170. This feature lists inventory and non-inventory items available with the company as an example of application 170 functionality. FIG. 5F is a simplified view having only one item while FIG. 5G has multiple items.

Figure 5H:
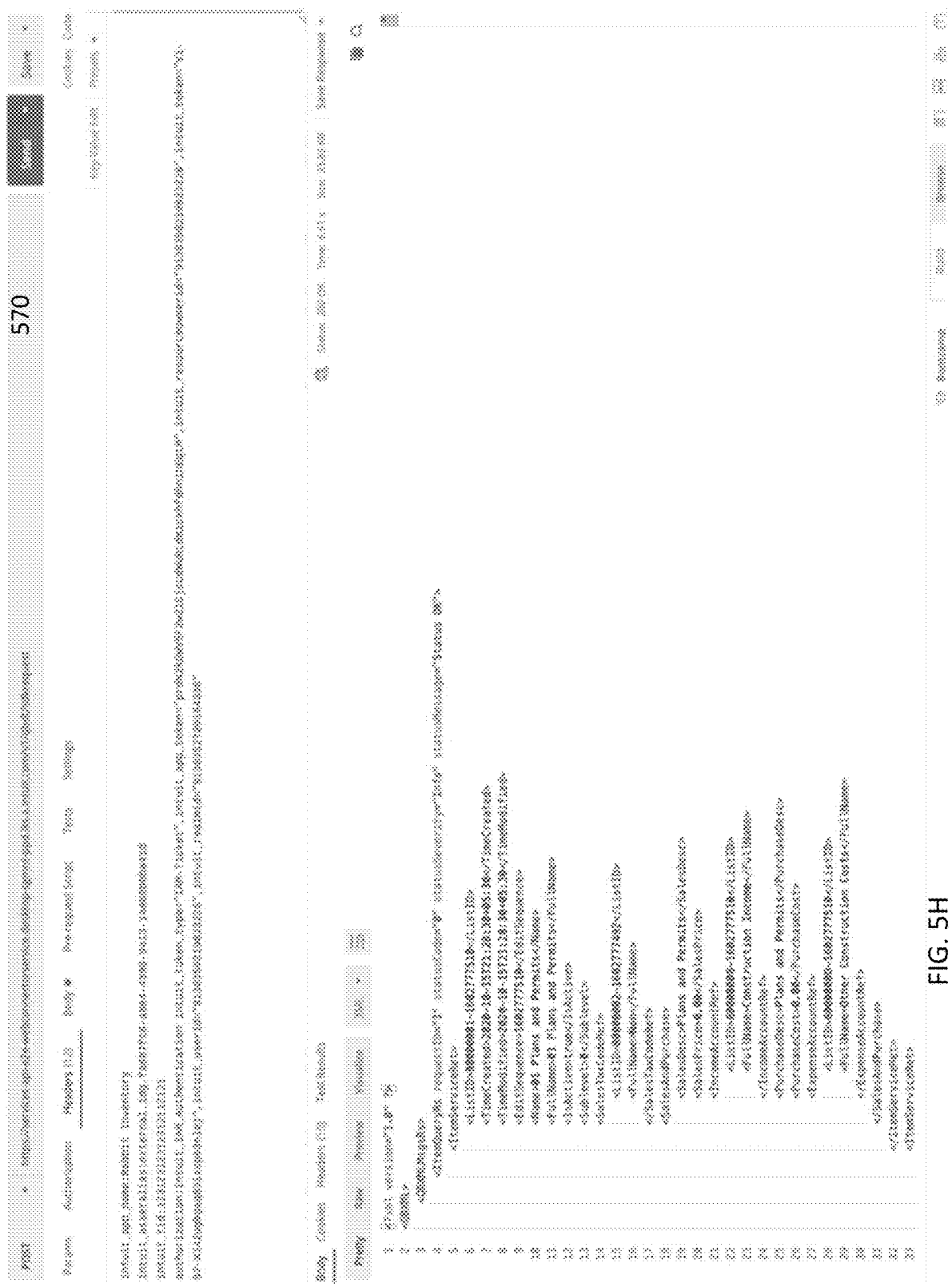

An example API call 570 is shown in FIG. 5H. Specifically, this is an example of how the above list of items available from FIGS. 5F-5G could be queried by the external device 190 via a RESTful API as described herein. The response of the RESTful API indicates that the operation was successful and returns the collection of items along with the item attributes.

Figure 6:
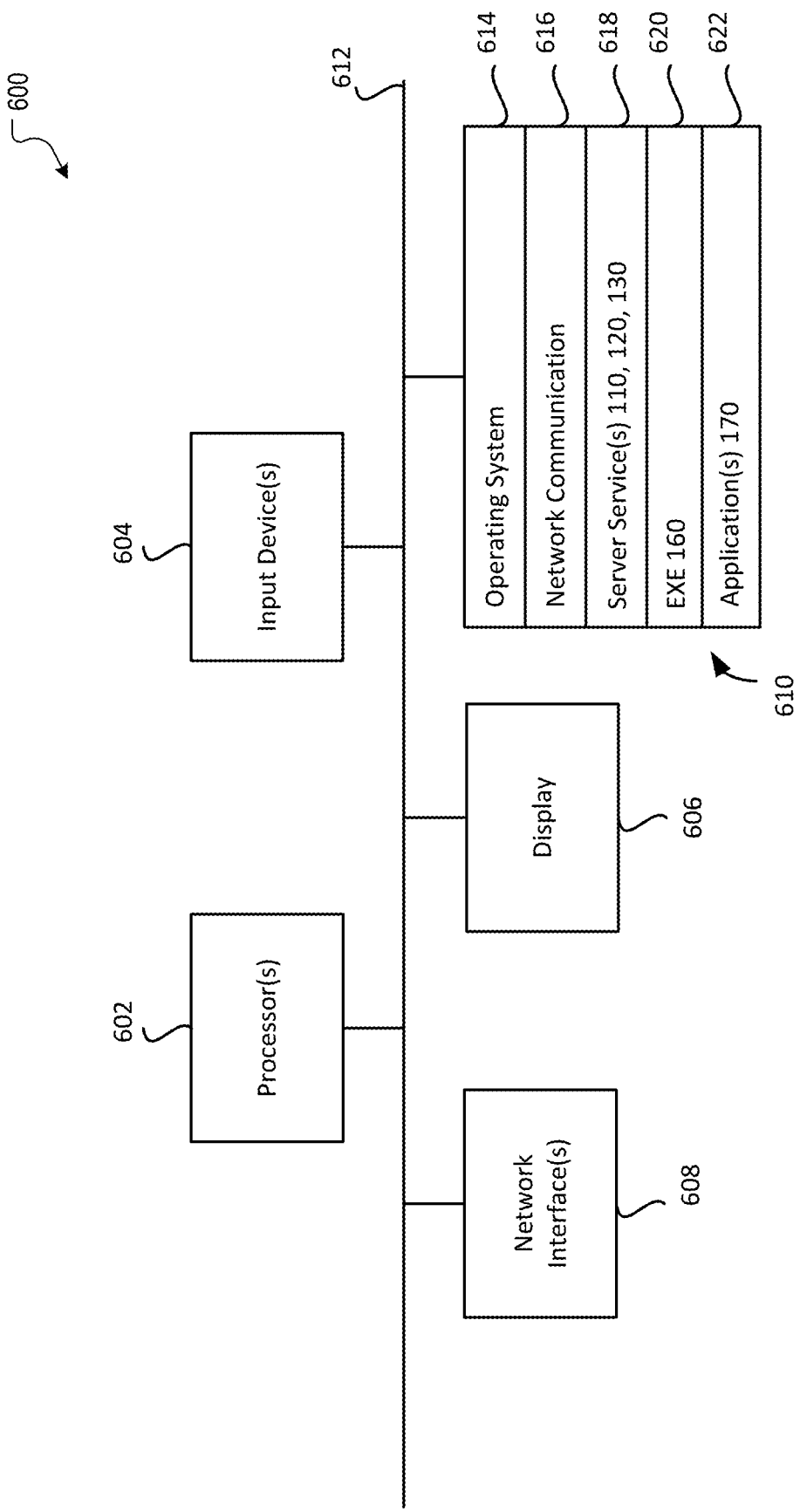
FIG. 6 shows a computing device according to some embodiments of the disclosure.

FIG. 6 shows a computing device 600 according to some embodiments of the disclosure. For example, computing device 600 may function as server 100, client 150, external device 190, any combinations thereof, or any portions thereof. In some embodiments, computing device 600 may be server 100 or a distributed element of server 100 that includes connection service 110, token service 120, and/or socket service 130. In some embodiments, computing device 600 may be client 150 that includes EXE 160 and/or application 170.

Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Server services 618 may include one or more of connection service 110, token service 120, and/or socket service 130, for example when computing device 600 is functioning as server 100 or a portion thereof. First executable process (EXE 160) 620 and application(s) 622 (including application 170) may be used when computing device 600 is functioning as client 150 or a portion thereof. In some embodiments, the various processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for making local data available in a cloud computing environment, the system comprising:
    a server configured to receive a request for data from an external device through a network; and
    a non-transitory computer-readable medium storing instructions that, when executed by a processor, cause the processor to perform processing of a first executable process comprising:
        establishing a persistent remote connection with the server, the persistent remote connection being maintained in an open state regardless of a status of the request for data;
        receiving, through the persistent remote connection, the request for data from the server;

obtaining the data from an application being executed by the processor separately from the first executable process; and sending, through the persistent remote connection, the data to the server;

wherein the server is further configured to receive the data through the persistent remote connection and send the data to the external device through the network in response to the request.

2. The system of claim 1, wherein the server is configured to receive the request for data by exposing an application programming interface (API) through the network and receiving the request for data through the API.

3. The system of claim 1, wherein obtaining the data comprises authenticating the request for data.

4. The system of claim 3, wherein the authenticating comprises validating a token included in the request for data as received by the server.

5. The system of claim 1, wherein obtaining the data comprises processing the request for data using a software development kit (SDK) of the application.

6. The system of claim 1, wherein the persistent remote connection is a websocket connection.

7. The system of claim 1, wherein the server is configured to provide the external device with a token prior to receiving the request for data from the external device, and wherein the request for data includes the token.

8. The system of claim 1, further comprising a token server configured to provide the external device with a token prior to receiving the request for data from the external device, and wherein the request for data includes the token.

9. A device configured to make local data available in a cloud computing environment, the device comprising:
   a processor configured to execute an application; and
   a non-transitory computer-readable medium storing instructions that, when executed by the processor, cause the processor to perform processing of a first executable process separate from the application, the processing comprising:
      establishing a persistent remote connection with a server;
      receiving, through the persistent remote connection, a request for data from the server, the request for data originating at an external device in network communication with the server, wherein the persistent remote connection is maintained in an open state regardless of a status of the request for data;
      obtaining the data from the application; and
      sending, through the persistent remote connection, the data to the server, thereby causing the server to send the data to the external device through the network in response to the request.

10. The device of claim 9, wherein obtaining the data comprises authenticating the request for data.

11. The device of claim 10, wherein the authenticating comprises validating a token included in the request for data as received by the server.

12. The device of claim 9, wherein obtaining the data comprises processing the request for data using a software development kit (SDK) of the application.

13. The device of claim 9, wherein the persistent remote connection is a websocket connection.

14. A method for making local data available in a cloud computing environment, the method comprising:
   establishing a persistent remote connection between a processor and a server;
   receiving, by the server, a request for data from an external device through a network;
   sending, through the persistent remote connection, the request for data from the server to a first executable process of the processor, wherein the persistent remote connection is maintained in an open state regardless of a status of the request for data;
   obtaining, by the processor, the data from an application being executed by the processor separately from the first executable process;
   sending, through the persistent remote connection, the data from the processor to the server; and
   sending, by the server, the data to the external device through the network in response to the request.

15. The method of claim 14, wherein receiving the request for data comprises exposing an application programming interface (API) through the network and receiving the request for data through the API.

16. The method of claim 14, wherein obtaining the data comprises authenticating the request for data.

17. The method of claim 16, wherein the authenticating comprises validating a token included in the request for data as received by the server.

18. The method of claim 14, wherein obtaining the data comprises processing the request for data using a software development kit (SDK) of the application.

19. The method of claim 14, wherein the persistent remote connection is a websocket connection.

20. The method of claim 14, further comprising providing, by the server, the external device with a token prior to receiving the request for data from the external device, wherein the request for data includes the token.

* * * * *